United States Patent [19]

Zolnowsky et al.

[11] Patent Number: 4,566,063
[45] Date of Patent: Jan. 21, 1986

[54] DATA PROCESSOR WHICH CAN REPEAT THE EXECUTION OF INSTRUCTION LOOPS WITH MINIMAL INSTRUCTION FETCHES

[75] Inventors: John Zolnowsky; Douglas B. MacGregor, both of Austin, Tex.; Kim Eckert, Downingtown, Pa.

[73] Assignee: Motorola, Inc., Schaumburg, Ill.

[21] Appl. No.: 542,800

[22] Filed: Oct. 17, 1983

[51] Int. Cl.⁴ .............................................. G06F 9/38
[52] U.S. Cl. .................................................. 364/200
[58] Field of Search ... 364/200 MS File, 900 MS File

[56] References Cited

U.S. PATENT DOCUMENTS 3,736,566  5/1973  Anderson et al. .................. 364/200
4,025,771  5/1977  Lynch, Jr. et al. ................. 364/200

Primary Examiner—Raulfe B. Zache
Attorney, Agent, or Firm—Anthony J. Sarli, Jr.; Jeffrey Van Myers

[57] ABSTRACT

A pipelined data processor capable of automatically storing in an external memory all essential information relating to the internal state thereof upon the detection of an access fault during instruction execution. Upon correction of the cause of the fault, the data processor automatically retrieves the stored state information and restores the state thereof in accordance with the retrieved state information. The data processor then resumes execution of the instruction. The faulted access may be selectively rerun upon the resumption of instruction execution. In response to detecting a particular sequence of a loopable instruction followed by a conditional branch instruction which selectively branches back to the loopable instruction, the data processor enters a loop mode wherein the loopable instruction and the branch instruction are internally recirculated around the pipeline to save instruction fetch cycles.

5 Claims, 9 Drawing Figures

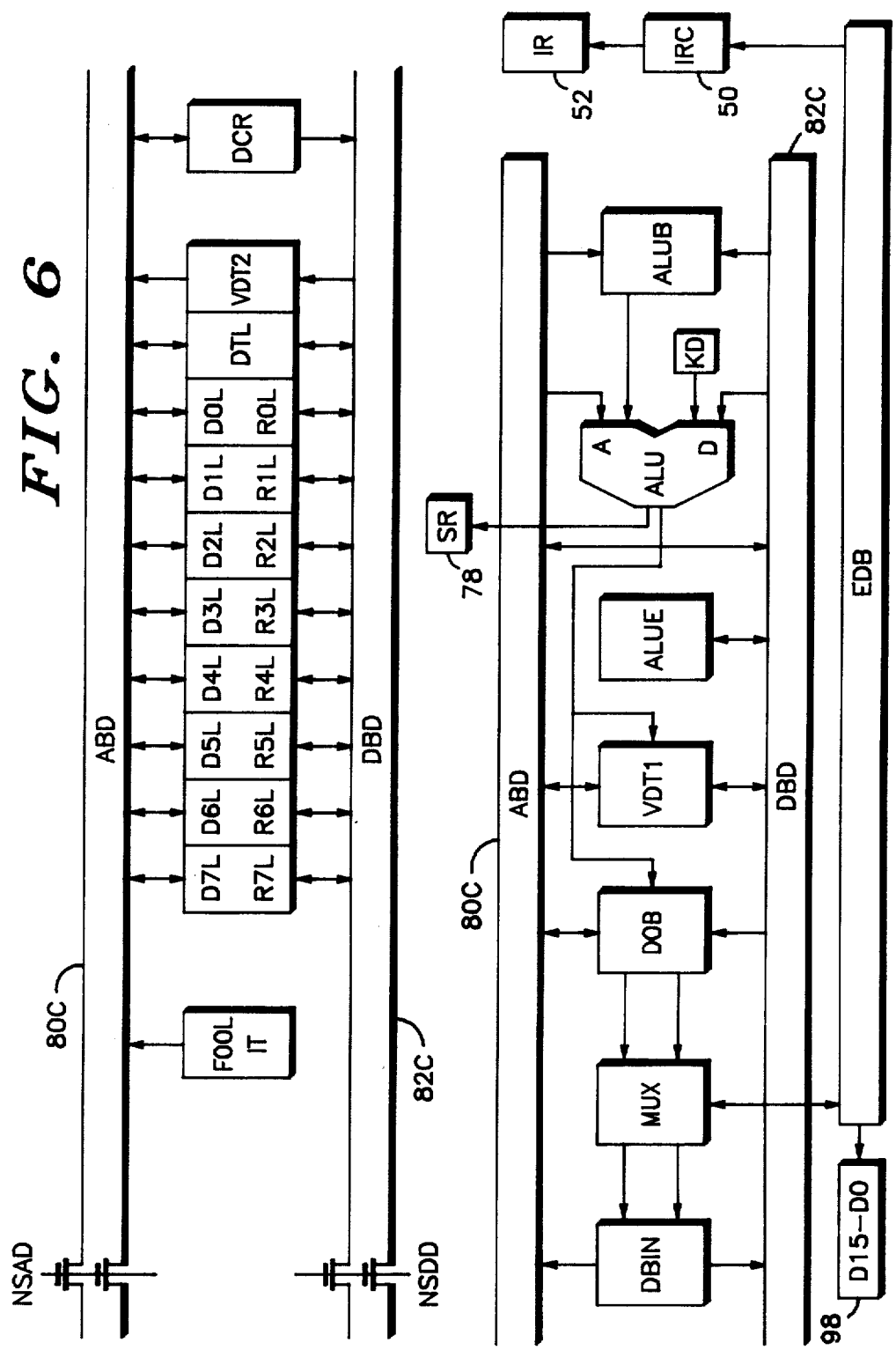

DATA PROCESSOR WHICH CAN REPEAT THE EXECUTION OF INSTRUCTION LOOPS WITH MINIMAL INSTRUCTION FETCHES

TECHNICAL FIELD

The present invention relates generally to data processors, and, more particularly, to one which can repeat the execution of instruction loops with minimal instruction fetches.

BACKGROUND ART

In the past, whenever it was desired to have a data processor repeat the execution of one or more instructions of a given program under selected conditions, the programmer had to construct an appropriate "software" loop. In general, such software loops consisted of the instructions to be repetitively executed, followed by a conditional branch instruction which tested for a selected condition. Typically, if the specified condition was not satisfied, the data processor branched back to the first instruction in the loop and again executed the "loop" of instructions. In these data processors, all of the instructions in the loop were fetched from memory each time the loop was repeated. This was true even in data processors which had instruction pipelines capable of retaining the entire loop of instructions.

In contrast to the general form of instruction loops, at least one data processor, the General Electric 600 Series, had a "repeat" instruction which required the processor to repeat the execution of the instruction following the repeat instruction for a specified number of times unless a specified condition was earlier satisfied. The same processor had a "repeat double" instruction which enabled the repeated execution of the following two (2) instructions. In both instances, having been advised in advance of the need to repeat the execution of the next instruction(s) in the instruction stream, the processor could then handle the "repeated" instructions in a special manner which made refetching unnecessary. However, in order to take advantage of this capability, the programmer or compiler had to exercize special care to detect those situations where only one (or two) instructions needed to be repeated. Perhaps more importantly, the resultant instruction sequence for such very "tight" loops differed considerably from the more general form of loops.

A variation of the "repeat" concept was implemented in the Intel 8086 microprocessor in the form of a special "prefix" which can be appended to any one of a class of instructions which manipulate "strings" of bytes or words to cause the repetition of the basic instruction a specified number of times or until a specified condition is satisfied. Besides being subject to the same limitations and objections as the original repeat technique, the prefix form was restricted to a very small subset of the instructions otherwise available for use in the general form of loops.

In summary, although substantially all data processors have the capability of executing loops of instructions of arbitrary size, no known data processor has the capability of independently detecting in the instruction stream each instruction loop which is of sufficiently small size as to fit within the internal instruction handling capability of the processor, and then automatically repeating the execution of that loop of instructions without fetching such instructions from memory each time the loop is repeated.

SUMMARY OF THE INVENTION

Accordingly, it is an object of the present invention to provide a data processor which can repeat the execution of selected instruction loops with minimal instruction fetches.

Another object is to provide a method for enabling a data processor to repeat the execution of selected instruction loops without having to fetch the instructions from memory prior to each execution thereof.

Yet another object is to provide a data processor having an instruction pipeline with means for repeating the execution of selected instruction loops without having to fetch each instruction from memory prior to each execution thereof.

These and other objects and advantages of the present invention are accomplished in a data processor comprising an instruction pipeline having at least input and output stages; bus cycle control means for selectively transferring a stream of instructions into the input stage of the pipeline; pipeline control means for selectively advancing the instructions from the input stage of the pipeline to the output stage thereof; and instruction execution means for executing each instruction advanced to the output stage of the pipeline, including a conditional branch instruction which specifies a selected branch destination and a selected control condition upon which the branch will be taken. In such a data processor, the present method allows the repeated execution of a selected loop of the instructions in the instruction stream with minimal use of the bus cycle control means, and comprises the steps of: (a) detecting the execution by the instruction execution means of one of said conditional branch instructions which specifies a branch destination corresponding to a target instruction preceding the conditional branch instruction in said stream of instructions by no more than the number of stages in the pipeline, the set of instructions between said target instruction and said conditional branch instruction, inclusive, comprising said loop of instructions; (b) sequentially enabling the bus cycle control means and the pipeline control means to transfer said loop of instructions into the pipeline, and to advance said target instruction to the output stage of the pipeline; (c) enabling the instruction execution means to execute the instruction at the output stage of the pipeline; (d) enabling the pipeline control means to advance the instructions in the pipeline while circulating the instruction just executed into a selected stage of the pipeline; and (e) if the instruction at the output stage of the pipeline is not the conditional branch instruction, returning to step (c); but (f) if the instruction at the output stage of the pipeline is the conditional branch instruction and said control condition is not satisfied, enabling the pipeline control means to again advance the instructions in the pipeline while circulating the conditional branch instruction into said selected stage of the pipeline, and then returning to step (c). In this manner, the data processor selectively repeats the execution of said loop of instructions by circulating said loop of instructions with said pipeline. A preferred method for realizing the general method comprises the steps of: selectively setting a loop control bit; sequentially enabling the bus cycle control means and the pipeline control means to advance an instruction to the output stage of the pipeline; enabling the instruction execution means to execute said instruction at the output stage of the pipeline; and if said loop control bit is set, enabling the pipeline control means to advance the instructions in the pipeline while inserting said instruction into a selected stage of the pipeline. Thus, this preferred method can be practiced in a data processor of the described form by providing only a small amount of additional apparatus.

BRIEF DESCRIPTION OF THE DRAWINGS

FIG. 6 is a block diagram of the data section of the execution unit of FIG. 3.

DESCRIPTION OF THE PRESENT INVENTION

Figure 1:
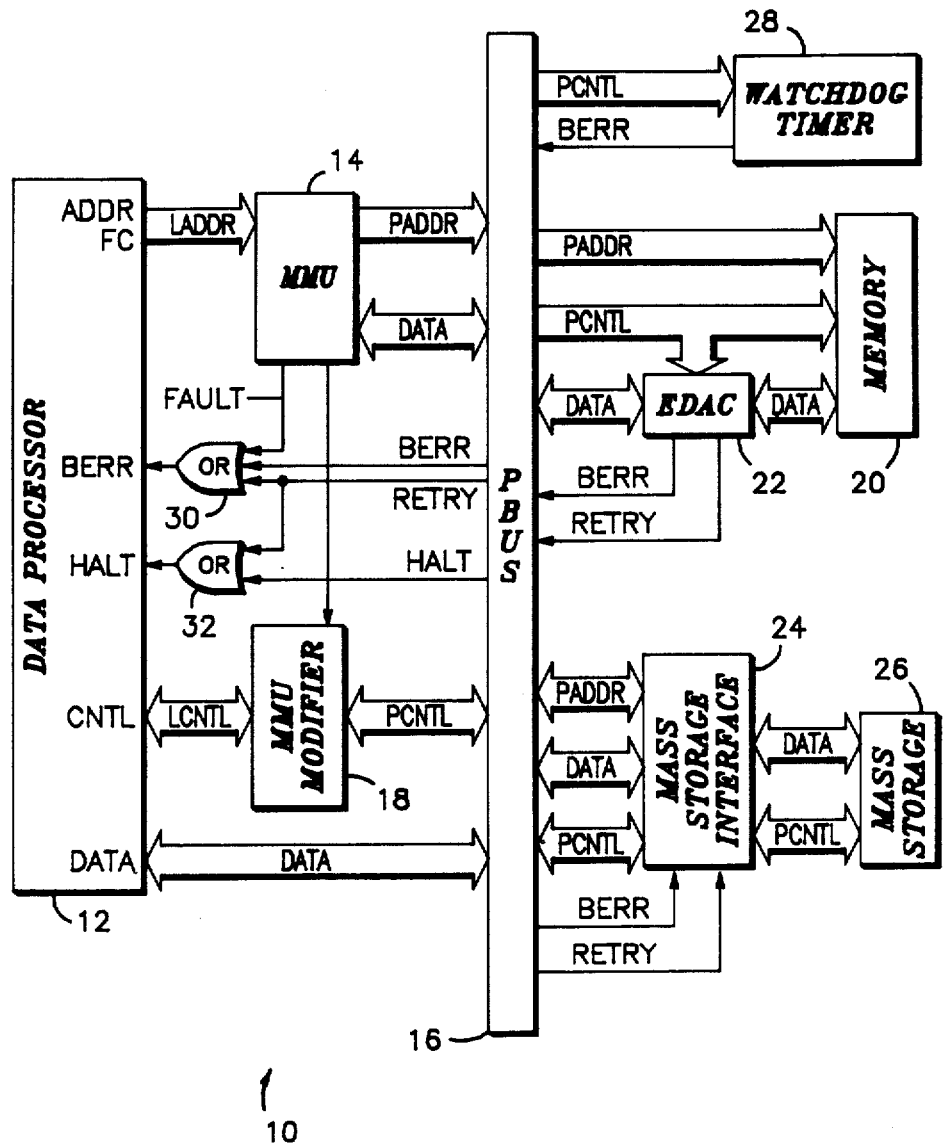
FIG. 1 is a block diagram of a data processing system having the data processor of the present invention.

Shown in FIG. 1 is a data processing system 10 wherein logical addresses (LADDR) issued by a data processor (DP) 12 are mapped by a memory management unit (MMU) 14 to a corresponding physical address (PADDR) for output on a physical bus (PBUS) 16. Simultaneously, the various logical access control signals (LCNTL) provided by DP 12 to control the access are converted to appropriately timed physical access control signals (PCNTL) by a modifier unit 18 under the control of MMU 14.

In response to a particular range of physical addresses (PADDR), memory 20 will cooperate with an error detection and correction circuit (EDAC) 22 to exchange data (DATA) with DP 12 in synchronization with the physical access control signals (PCNTL) on PBUS 16. Upon detecting an error in the data, EDAC 22 will either signal a bus error (BERR) or request DP 12 to retry (RETRY) the exchange, depending upon the type of error.

In response to a different physical address, mass storage interface 24 will cooperate with MP 12 to transfer data to or from mass storage 26. If an error occurs during the transfer, interface 24 may signal a bus error (BERR) or, if appropriate, request a retry (RETRY).

In the event that the MMU 14 is unable to map a particular logical address (LADDR) into a corresponding physical address (PADDR), the MMU 14 will signal an access fault (FAULT). As a check for MMU 14, a watchdog timer 28 may be provided to signal a bus error (BERR) if no physical device has responded to a physical address (PADDR) within a suitable time period relative to the physical access control signals (PCNTL).

If, during a data access bus cycle, a RETRY is requested, OR gates 30 and 32 will respectively activate the BERR and HALT inputs of DP 12. In response to the simultaneous activation of both the BERR and HALT inputs thereof during a DP-controlled bus cycle, DP 12 will abort the current bus cycle and, upon the termination of the RETRY signal, retry the cycle.

If desired, operation of DP 12 may be externally controlled by judicious use of a HALT signal. In response to the activation of only the HALT input thereof via OR gate 32, DP 12 will halt at the end of the current bus cycle, and will resume operation only upon the termination of the HALT signal.

In response to the activation of only the BERR input thereof during a processor-controlled bus cycle, DP 12 will abort the current bus cycle, internally save the contents of the status register, enter the supervisor state, turn off the trace state if on, and generate a bus error vector number. DP 12 will then stack into a supervisor stack area in memory 20 a block of information which reflects the current internal context of the processor, and then use the vector number to branch to an error handling portion of the supervisor program.

Up to this point, the operation of DP 12 is identical to the operation of Motorola's MC68000 microprocessor. However, DP 12 differs from the MC68000 in the amount of information which is stacked in response to the assertion of BERR. The information stacked by the MC68000 consists of: the saved status register, the current contents of the program counter, the contents of the instruction register which is usually the first word of the currently executing instruction, the logical address which was being accessed by the aborted bus cycle, and the characteristics of the aborted bus cycle, i.e. read/write, instruction/data and function code. In addition to the above information, DP 12 is constructed to stack much more information about the internal machine state. If the exception handler is successful in resolving the error, the last instruction thereof will return control of DP 12 to the aborted program. During the execution of this instruction, the additional stacked information is retrieved and loaded into the appropriate portions of DP 12 to restore the state which existed at the time the bus error occurred.

Figure 2:
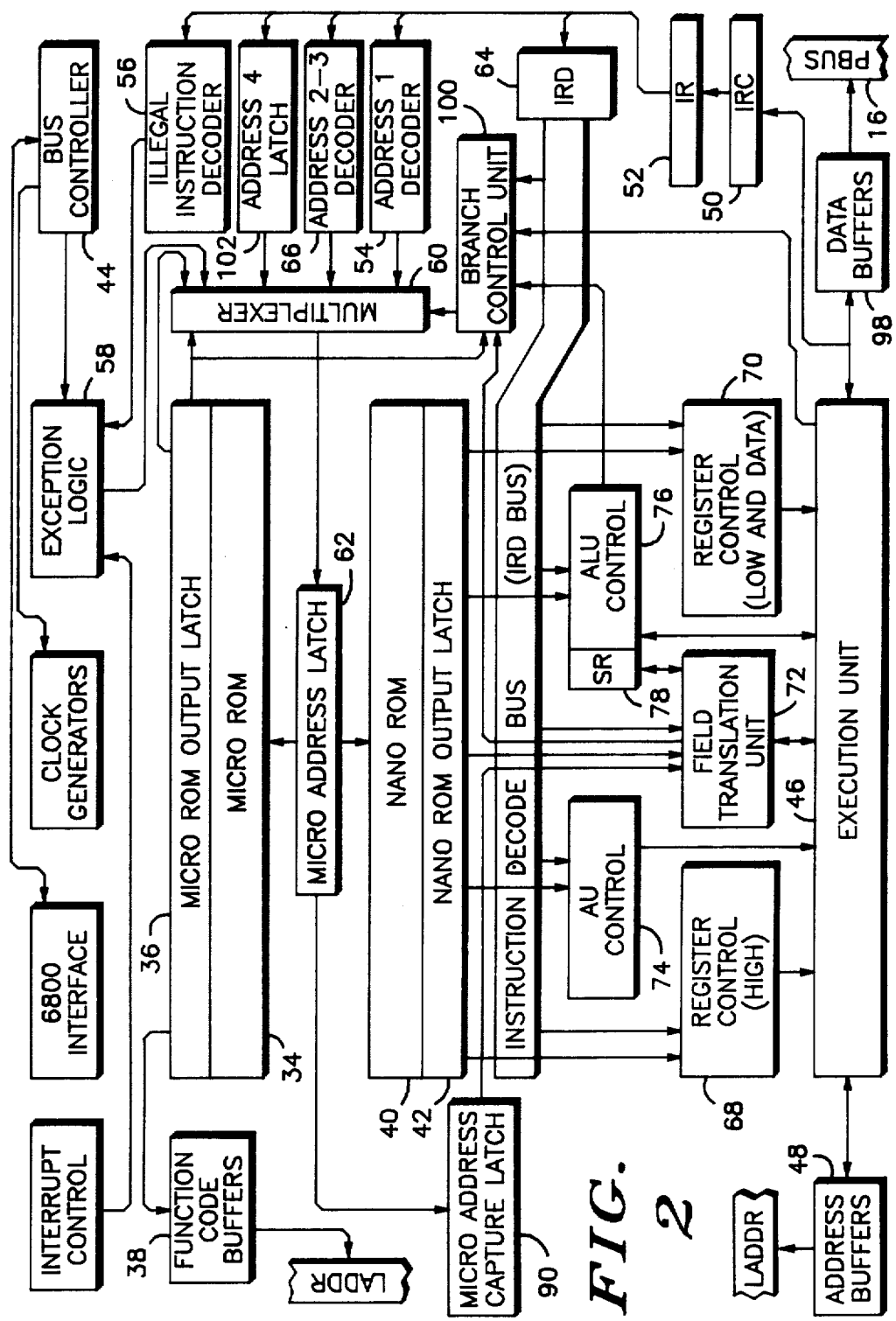
FIG. 2 is a block diagram of the data processor of FIG. 1.

The preferred operation of DP 12 will be described with reference to FIG. 2 which illustrates the internal organization of a microprogrammable embodiment of DP 12. Since the illustrated form of DP 12 is very similar to the Motorola MC68000 microprocessor described in detail in the several U.S. Patents cited hereafter, the common operational aspects will be described rather broadly. Once a general understanding of the internal architecture of DP 12 is established, the discussion will focus on the unique aspects which distinguish DP 12 from the MC68000, and enable DP 12 to selectively repeat the execution of instructions without performing instruction fetch bus cycles for each instruction so executed.

The DP 12, like the MC68000, is a pipelined, microprogrammed data processor. In a pipelined processor, each instruction is typically fetched during the execution of the preceding instruction, and the interpretation of the fetched instruction usually begins before the end of the preceding instruction. In a microprogrammed data processor, each instruction is executed as a sequence of microinstructions which perform small pieces of the operation defined by the instruction. If desired, user instructions may be thought of as macroinstructions to avoid confusion with the microinstructions. In the MC68000 and DP 12, each microinstruction comprises a microword which controls microinstruction sequencing and function code generation, and a corresponding nanoword which controls the actual routing of information between functional units and the actuation of special function units within DP 12. With this in mind, a typical instruction execution cycle will be described.

At an appropriate time during the execution of each instruction, a prefetch microinstruction will be executed. The microword portion thereof will, upon being loaded from micro ROM 34 into micro ROM output latch 36, enable function code buffers 38 to output a function code (FC) portion of the logical address (LADDR) indicating an instruction cycle. Upon being simultaneously loaded from nano ROM 40 into nano ROM output latch 42, the corresponding nanoword requests bus controller 44 to perform an instruction fetch bus cycle, and instructs execution unit 46 to provide the logical address of the first word of the next instruction to address buffers 48. Upon obtaining control of the PBUS 16, bus controller 44 will enable address buffers 48 to output the address portion of the logical address (LADDR). Shortly thereafter, bus controller 44 will provide appropriate data strobes (some of the LCNTL signals) to activate memory 20. When the memory 20 has provided the requested information, bus controller 44 enables instruction register capture (IRC) 50 to input the first word of the next instruction from PBUS 16. At a later point in the execution of the current instruction, another microinstruction will be executed to transfer the first word of the next instruction from IRC 50 into instruction register (IR) 52, and to load the next word from memory 20 into IRC 50. Depending upon the type of instruction in IR 52, the word in IRC 50 may be immediate data, the address of an operand, or the first word of a subsequent instruction. Details of the instruction set and the microinstruction sequences thereof are set forth fully in U.S. Pat. No. 4,325,121 entitled "Two Level Control Store for Microprogrammed Data Processor", issued Apr. 13, 1982 to Gunter et al.

As soon as the first word of the next instruction has been loaded into IR 52, address 1 decoder 54 begins decoding certain control fields in the instruction to determine the micro address of the first microinstruction in the initial microsequence of the particular instruction in IR 52. Simultaneously, illegal instruction decoder 56 will begin examining the format of the instruction in IR 52. If the format is determined to be incorrect, illegal instruction decoder 56 will provide the micro address of the first microinstruction of an illegal instruction microsequence. In response to the format error, exception logic 58 will force multiplexor 60 to substitute the micro address provided by illegal instruction decoder 56 for the micro address provide by address 1 decoder 54. Thus, upon execution of the last microinstruction of the currently executing instruction, the microword portion thereof may enable multiplexor 60 to provide to an appropriate micro address to micro address latch 62, while the nanoword portion thereof enables instruction register decoder (IRD) 64 to load the first word of the next instruction from IR 52. Upon the selected micro address being loaded into micro address latch 62, micro ROM 34 will output a respective microword to micro ROM output latch 36 and nano ROM 40 will output a corresponding nanoword to nano ROM output latch 42.

Generally, a portion of each microword which is loaded into micro ROM output latch 36 specifies the micro address of the next microinstruction to be executed, while another portion determines which of the alternative micro addresses will be selected by multiplexor 60 for input to micro address latch 62. In certain instructions, more than one microsequence must be executed to accomplish the specified operation. These tasks, such as indirect address resolution, are generally specified using additional control fields within the instruction. The micro addresses of the first microinstructions for these additional microsequences are developed by address 2/3 decoder 66 using control information in IR 52. In the simpler form of such instructions, the first microsequence will typically perform some preparatory task and then enable multiplexor 60 to select the micro address of the microsequence which will perform the actual operation as developed by the address 3 portion of address 2/3 decoder 66. In more complex forms of such instructions, the first microsequence will perform the first preparatory task and then will enable multiplexor 60 to select the micro address of the next preparatory microsequence as developed by the address 2 portion of address 2/3 decoder 66. Upon performing this additional preparatory task, the second microsequence then enables multiplexor 60 to select the micro address of the microsequence which will perform the actual operation as developed by the address 3 portion of address 2/3 decoder 66. In any event, the last microinstruction in the last microsequence of each instruction will enable multiplexor 60 to select the micro address of the first microinstruction of the next instruction as developed by address 1 decoder 54. In this manner, execution of each instruction will proceed through an appropriate sequence of microinstructions. A more thorough explanation of the micro address sequence selection mechanism is given in U.S. Pat. No. 4,342,078 entitled "Instruction Register Sequence Decoder for Microprogrammed Data Processor" issued July 27, 1982 to Tredennick et al.

In contrast to the microwords, the nanowords which are loaded into nano ROM output latch 42 indirectly control the routing of operands into and, if necessary, between the several registers in the exection unit 46 by exercising control over register control (high) 68 and register control (low and data) 70. In certain circumstances, the nanoword enables field translation unit 72 to extract particular bit fields from the instruction in IRD 64 for input to the execution unit 46. The nanowords also indirectly control effective address calculations and actual operand calculations within the execution unit 46 by exercising control over AU control 74 and ALU control 76. In appropriate circumstances, the nanowords enable ALU control 76 to store into status register (SR) 78 the condition codes which result from each operand calculation by execution unit 46. A more detailed explanation of ALU control 76 is given in U.S. Pat. No. 4,312,034 entitled "ALU and Condition Code Control Unit for Data Processor" issued Jan. 19, 1982 to Gunter et al.

Figure 3:
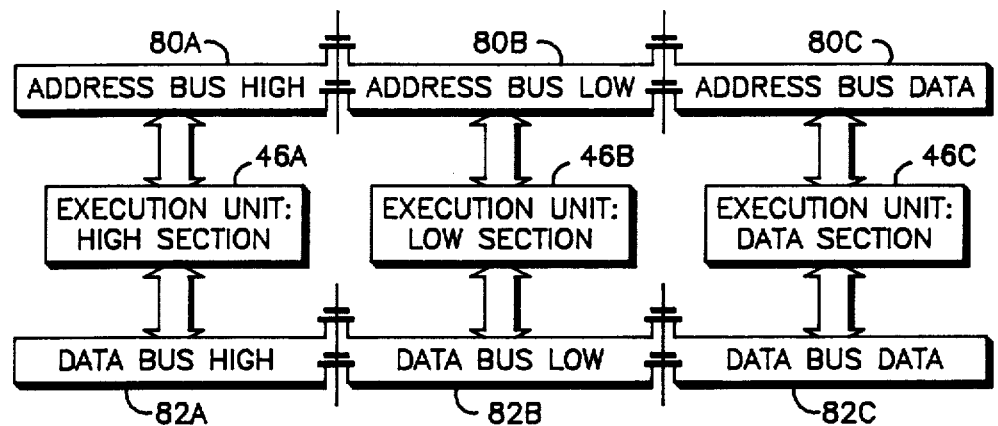
FIG. 3 is block diagram of the execution unit of the data processor of FIG. 2.

As can be seen in FIG. 3, the execution unit 46 in DP 12, like the execution unit in the MC68000, comprises a high section 46A, a low section 46B, and a data section 46C, which can be selectively connected to respective segments of address and data buses 80 and 82, respectively. Since execution unit 46 is so similar to the execution unit of the MC68000 as described in U.S. Pat. No. 4,296,469, the common functional units will be described only briefly, followed by a more detailed description of the new elements which allow DP 12 to support virtual memory and to execute loops internally.

Figure 4:
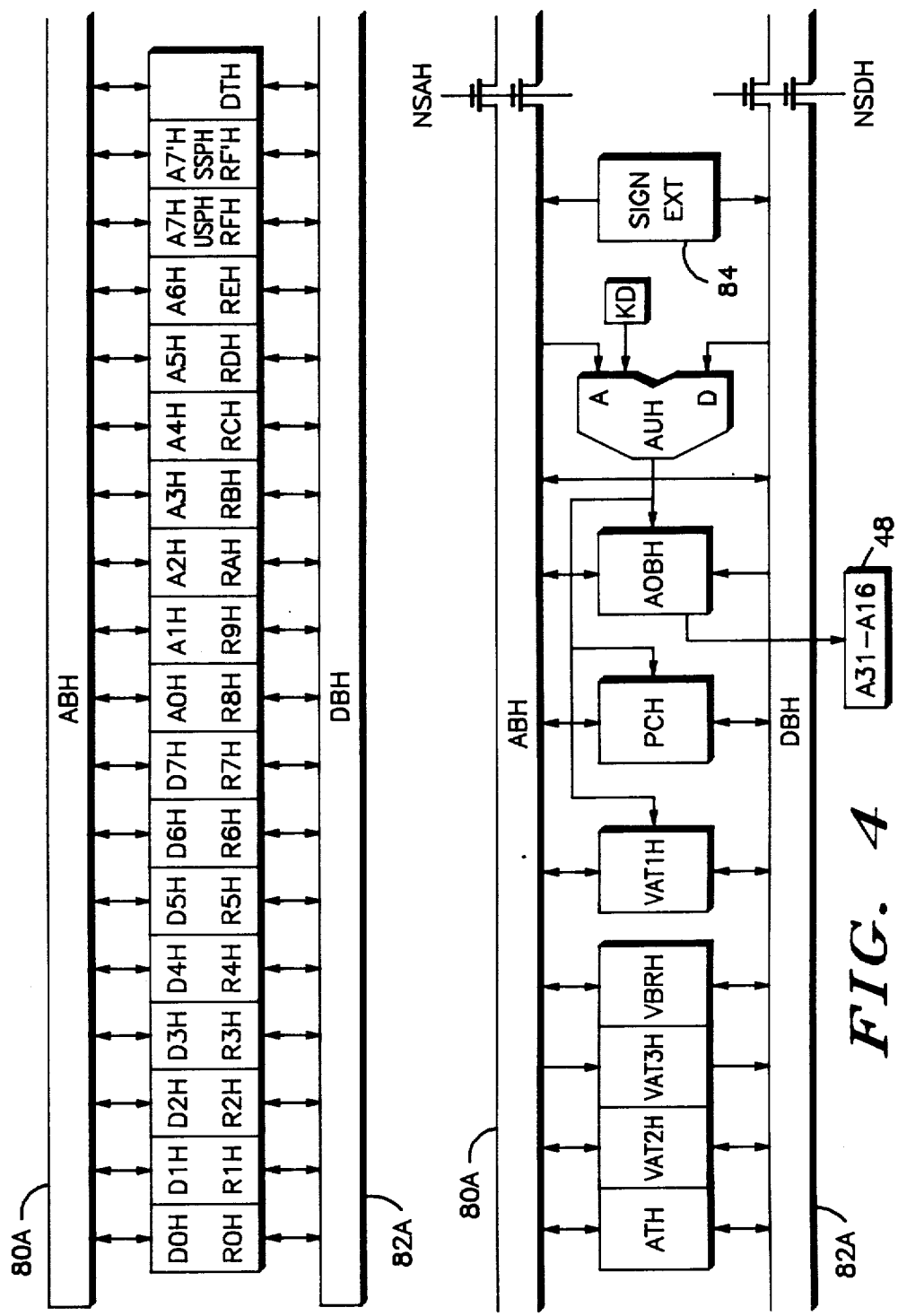
FIG. 4 is a block diagram of the high section of the execution unit of FIG. 3.
Figure 5:
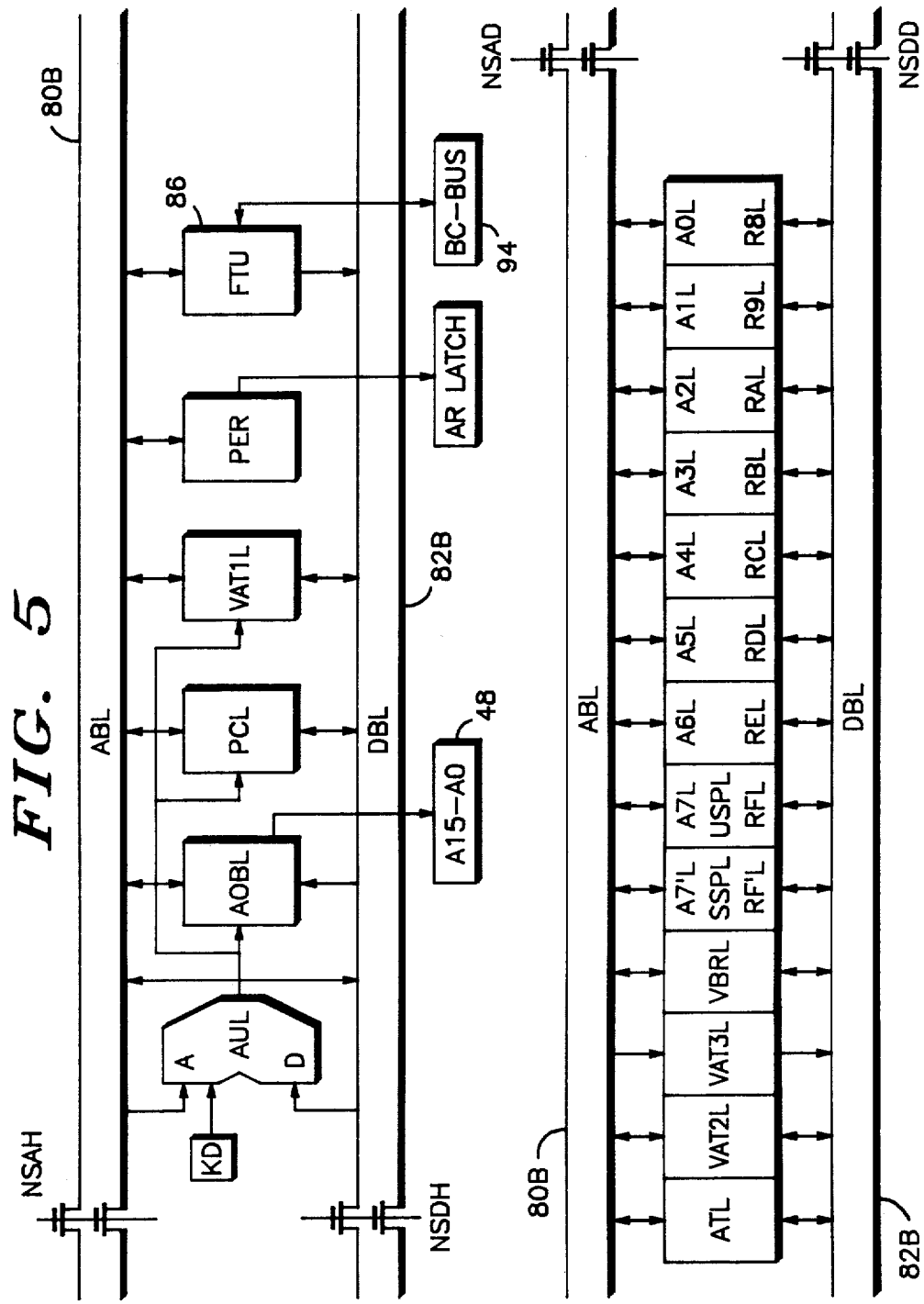
FIG. 5 is a block diagram of the low section of the execution unit of FIG. 3.

As shown in FIG. 4, the high section 46A is comprised primarily of a set of nine high address registers AφH-A7'H for storing the most significant 16 bits of 32 bit address operands, a set of eight high data registers DφH-D7H for storing the most significant 16 bits of 32 bit data operands, a temporary high address register ATH, a temporary high data register DTH, an arithmetic unit high AUH for performing arithmetic calculations on operands provided on the high section of address and data buses 80 and 82, a sign extension circuit 84 for allowing 32 bit operations on 16 bit operands, and the most significant 16 bits of the program counter PCH and address output buffers AOBH. As shown in FIG. 5, the low section 46B is comprised primarily of a set of nine low address registers AφL-A7'L for storing the least significant 16 bits of 32 bit address operands, an arithmetic unit low AUL for performing arithmetic calculations on operands provided on the low section of address and data buses 80 and 82, a priority encoder register PER used in multi-register move operations, and the least significant 16 bits of the program counter PCL and address output buffers AOBL. FIG. 5 also illustrates the relationship of an FTU register 86 in field translation unit 72 to the low sections of address and data buses 80 and 82. As shown in FIG. 6, the data section 46C is comprised primarily of a set of eight low data registers DφL-D7L for storing 16 bit operands which may be the least significant 16 bits of 32 bit data operands, a decoder register DCR for generating 16 bit operand masks, an arithmetic and logic unit ALU for performing arithmetic and logical operations on operands provided on the data section of address and data buses 80 and 82, an ALU buffer register ALUB, an ALU extension register ALUE for multiword shift operations, and multiplexed data input and output buffers DBIN and DOB, respectively.

Thus far, DP 12 has been described in terms of the hardware features which are common with the MC68000. DP 12 also responds to error conditions in a manner somewhat similar to the MC68000. Recall that MMU 14 will signal an address error by generating a FAULT signal, while the other peripheral circuits report bus errors by issuing a BERR signal. In either event, DP 12 will receive a BERR signal via OR gate 30. In response to the BERR signal, bus controller 44 will notify exception logic 58 of the error and then orderly terminate the faulty bus cycle. Exception logic 58 then provides multiplexor 60 with the micro address of the bus error exception handler microsequence to be forced into the micro address latch 62. At this point, the MC68000 would simply load the micro address provided by exception logic 58 into micro address latch 62 and control would pass to the exception handler microsequence to stack out the following information:

SSWB Special System Status Word Bus 88 (described hereinafter);
AOBH Access Address High;
AOBL Access Address Low;
IRD Instruction Register Decode 64;
SR Status Register 78;
PCH Program Counter High; and
PCL Program Counter Low.

Figure 7:
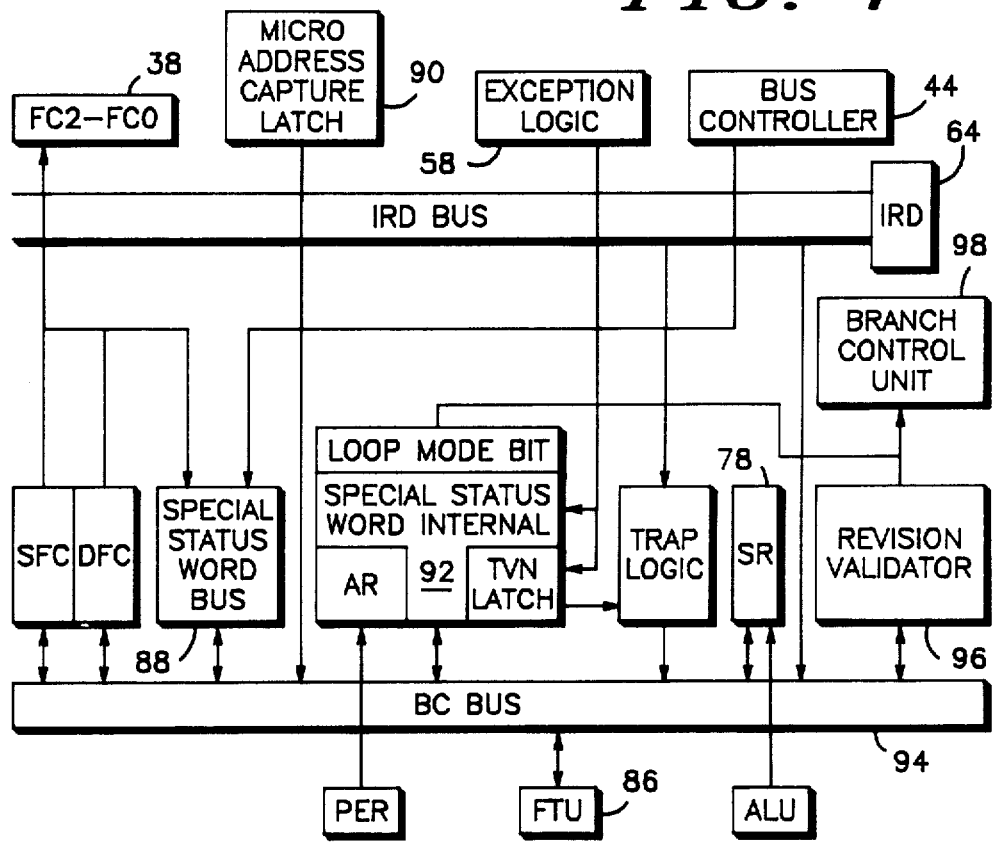
FIG. 7 is a block diagram illustrating the relationship of the field translation unit of the data processor of FIG. 2 to other functional units therein.

While this information is ordinarily adequate to determine the cause of the error, this information is not sufficient to allow the present state to be restored after the error has been resolved. Accordingly, DP 12 internally saves additional information about the current state thereof, before loading the micro address of the exception handler microsequence. To accomplish this, DP 12 has several additional registers for capturing the necessary state information, and some additional access paths are provided to certain existing registers. For example, as shown in FIG. 2, DP 12 has a micro address capture latch 90 for storing the micro address in the micro address latch 62 at the time the fault occurred. Within field translation unit 72, a special status word internal (SSWI) register 92 is provided as shown in FIG. 7 to save the following:

PR Trap Privilege Exception Latch (from exception logic 58);
TR Trap Trace Exception Latch (from exception logic 58);
TP Trace Pending Latch (from SR 78);
LP Loop Mode Bit (new bit described hereinafter);
HX Hidden-X Status Bit (from ALU);
ARx Priority Encoder Output Register Selector (from PER); and
TVN Trap Vector Number Latch (from exception logic 58).

In addition, the special status word bus (SSWB) register 88 in field translation unit 72, which in the MC68000 saved only:

R/W Read/Write (R/W); and
FC Function Code for faulted access;

now saves the following additional information:
IF nanoROM bit NIRC (instruction fetch to IRC);
DF nanoROM bit NDBI (data fetch to DBIN);
RM Read-Modify-Write cycle;
HB nanoROM bit NIOH (high byte transfer from DOB or to DBIN); and
BY byte/word transfer.

Once this additional state information has been latched, DP 12 loads the micro address provided by exception logic 58 into micro address latch 62 and begins executing the exeception handler microsequence. In the exception handler microsequence of DP 12, the initial microinstructions must clear the address calculation and output paths in execution unit 46 so that the stack address may be safely calculated and provided to MMU 14. Accordingly, several additional registers are provided in the execution unit 46 to store the existing address, data and control information: in the high section 46A shown in FIG. 4, three virtual address temporary high registers VAT1H-VAT3H are provided to facilitate capture of the output of AUH and the address in AOBH; in the low section 46B shown in FIG. 5, three virtual address temporary low registers VAT1L-VAT3L are provided to allow capture of the output of AUL and the address in AOBL; and, in the data section 46C shown in FIG. 6, two virtual data temporary registers VDT1-VDT2 are provided to store the control information in FTU register 86 and the data in DOB. Having cleared the execution unit 46, the exception handler calculates the stack address and proceeds to stack the following information:

SR Status Register 78;
PCH Program Counter High;
PCL Program Counter Low;
VOR Stack Frame Format and Vector Offset;
SSWB Special System Status Word Bus 88;
AOBH Access Address High;
AOBL Access Address Low;
DOB Data Output Buffer;
DIB Data Input Buffer;
IRC Instruction Register Capture Register 50;
MAL Micro Address Capture Latch 90;

ALUB Contents of ALUB;
FTU Field Translate Unit FTU Register 86;
ATH Address Temporary High;
ALU ALU Output Latch;
ATL Address Temporary Low;
AUH AU Latch High;
AUL AU Latch Low;
DCRL Decoder Latch;
PERL PER Output Register;
SSWI Special Status Word Internal 92;
IR Instruction Register 52;
DTH Data Temporary High;
DTL Data Temporary Low;
IRD Instruction Register Decode 64; and
ALUE ALUE Register.

The exception handler microsequence then vectors to the error recovery routine in the supervisor program. Using the stacked state information, the supervisor program can determine the cause of the fault, and, if appropriate, attempt to fix the problem. For example, an access to a logical address which has no corresponding physical address may simply require that a block of program/data be loaded from mass storage 26 into memory 20. Of course, other processing may also be performed before the faulted program is restarted.

To return control to a program which has been suspended, the supervisor program in both the MC68000 and DP 12 executes a return from exception (RTE) instruction. In the MC68000, this instruction will be executed only if the exeception was of the type which occurred on instruction boundaries. Thus, the microsequence for this instruction could simply reload the status register SR 78 and program counter PCH-PCL from the stack, and then pass control to the instruction whose address is in the program counter. In DP 12, this instruction is also used to return from access faults which typically occur during execution of an instruction. Accordingly, the initial microinstructions in this microsequence fetch the VOR word from the stack to determine the stack frame format. If the short format is indicated, the microsequence will proceed as in the MC68000. If, on the other hand, the long format is indicated, several other words are fetched from the stack to assure that the full frame is available in memory. If the frame format is neither short nor long, DP 12 will assume that the stack frame is either incorrect or was generated by an incompatible type of processor and will transfer control to a stack frame format error exception handler microsequence. If another fault is generated at this stage, indicating that a portion of the stack frame has been inadvertantly swapped out of memory 20, the same access fault handling procedure will be used to retrieve the rest of the stack.

During the microsequence which stacks the state information, the micro address contained in the micro address capture latch 90 is coupled to FTU register 86 in field translation unit 72 via a portion of a BC bus 94, as shown in FIG. 7. Simultaneously, a revision validator 96 impresses on the available portion of BC bus 94 a code which uniquely identifies the version of the microcode contained within DP 12. This combined word is subsequently transferred into DOB in the data section 46C of the execution unit 46 for output via data buffers 98 to memory 20. During the validation phase of the instruction continuation microsequence, the MAL word is fetched from the stack and loaded into both IRC 50 and DBIN in the data section 46C of the execution unit 46. From DBIN, MAL is transferred to FTU register 86 and coupled to BC bus 94. Revision validator 96 then compares the version number portion of MAL to the internal version number. If they are not the same, revision validator 96 will signal branch control unit 100 to transfer control to the stack frame format exeception handler microsequence. Otherwise, revision validator 96 will simply allow the microsequence to load the micro address portion of MAL into address 4 latch 102.

Once the stack frame has been determined to be valid, the microsequence will enter a critical phase where any fault will be considered a double fault and DP 12 will terminate processing until externally reset. During this phase, the rest of the information in the stack is fetched and either reloaded into the original locations or into the several temporary registers. For example, the contents of the micro address latch 62 which were captured by the micro address capture latch 90 will be loaded into address 4 latch 102. However, only after the last stack access are the contents of AUH-AUL and SR 78 restored from the temporary registers. The last microinstruction in this instruction continuation microsequence restores the contents of AOBH, AOBL, FTU register 86, and DOB, signals bus controller 44 to restart the faulted bus cycle using the information in SSWB 88, and requests multiplexor 60 to select the micro address in address 4 latch 102.

In the preferred form, bus controller 44 will respond to the restart signal provided by the last microinstruction of the instruction continuation microsequence by examining a rerun bit RR in SSWB 88. If the supervisor has not set the RR bit in the stack, the bus controller 44 will proceed to rerun the faulted bus cycle under control of the other information in SSWB 88, and then signal exception logic 58 when the cycle has been successfully completed. If, on the other hand, the supervisor has set the RR bit, the bus controller 44 will not rerun the bus cycle, but will simply signal exception logic 58 that the cycle is complete. In response to the cycle complete signal, exception logic 58 will enable multiplexor 60 to output the micro address in address 4 latch 102 to micro address latch 62. The faulted instruction will then resume control of DP 12 as if the fault had never occurred.

At this point, it may be useful to review the manner in which DP 12 sequences each instruction in the instruction steam through IRC 50, IR 52, and IRD 64, in order to emphasize the pipelined nature of the process. Recall that the "current" instruction is typically contained in both IR 52 and IRD 64 during the execution of most of the microsequence for such instruction. Assuming that the "current" instruction is a multiple word instruction, the "next" instruction in the instruction stream is loaded into the input stage of the instruction pipeline, that is IRC 50, by a convenient one of the microinstructions relatively early in the microsequence of the "current" instruction. After the "current" instruction microsequence has progressed to the point where decoders 54, 56, 66 and 102 are no longer required, this "next" instruction is transferred from IRC 50 into the output stage of the instruction pipeline or IR 52 by another microinstruction in the microsequence of the "current" instruction. Once the "next" instruction is in IR 52, decoders 54, 56, 66 and 102 can be released to begin the respective decoding operations, even though the "current" instruction microsequence may not have finished. At this point, IRC 50 is typically loaded with the next word in the instruction stream, which will be either the second word of the "next" instruction now in IR 50 or the first word of a third instruction. Thus, depending upon the instruction stream, the pipeline may briefly contain three (3) instructions: the "current" instruction in IRD 64, the "next" instruction in IR 52, and the following instruction in IRC 50.

Upon executing the last microinstruction in the microsequence of the "currrent" instruction, address 1 decoder 54 is enabled to provide the micro address of the first microinstruction in the microsequence of the "next" instruction in IR 52, unless of course illegal instruction decoder 56 overrides. Simultaneously, the "next" instruction in IR 52 is copied into IRD 64 for decoding, thereby becoming the new "current" instruction. After all subsequent uses of the outputs of decoders 66 or 102 which may be required to complete the "current" instruction, IR 52 is again available to receive the "next" instruction from IRC 50. By using IRD 64 in this manner, IR 52 is available for receiving the "next" instruction earlier in the microsequence of the "current" instruction so that decoders 54 and 56, particularly, will often have completed the respective operations before the execution of the last microinstruction of the microsequence of the "current" instruction.

Remember that DP 12 increments the program counter PC immediately before each instruction stream prefetch from memory 20 into the instruction pipeline. Thus, in general, PC points not to the currently executing instruction but rather to the next word to be loaded into the instruction pipeline. Whenever the "current" instruction requires a jump or a branch to a different point in the instruction stream, DP 12 must load the specified branch destination address into PC. DP 12 must then fill the instruction pipeline by prefetching two (2) words from the new PC address in memory 20, incrementing PC before the second access, before beginning execution of the instruction at the branch destination.

The instruction set of DP 12, like the MC68000, includes a "Test Condition, Decrement, and Branch" (DBcc) instruction. This instruction, which is two (2) words in length, may be considered a "looping primitive" having three parameters: a condition upon which the loop is to be terminated, a data register which acts as a loop counter, and a branch address displacement. In general, this instruction requires that the specified condition be first tested to determine if the termination condition for the loop has been met, and if so, no operation is performed. If the termination condition is not true, the low order sixteen (16) bits of the specified data register are decremented by one (1). If the result is minus one (−1), the loop count is exhausted and execution continues with the next instruction. If the result is not equal to minus one (−1), execution continues at the location indicated by the current value of the program counter (PC) plus the specified branch address displacement.

Figure 8:
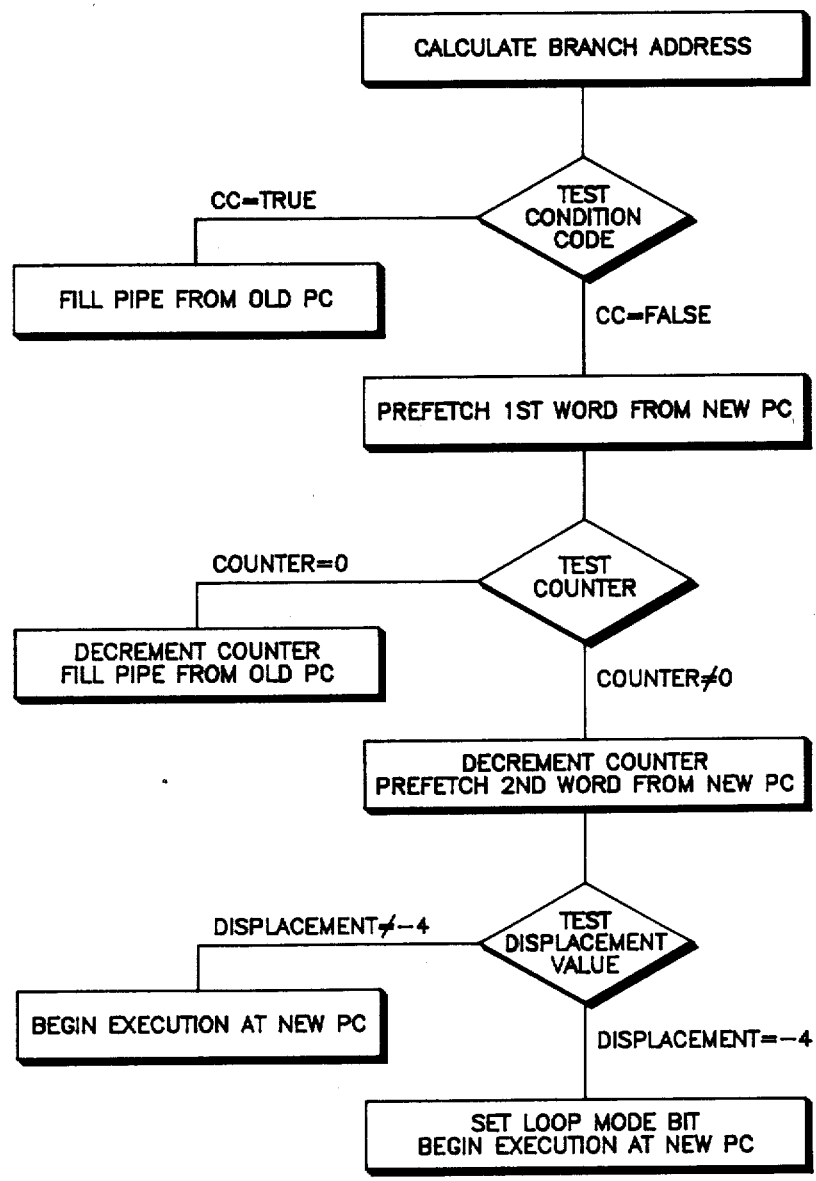
FIG. 8 is a flow diagram of a loop instruction primitive in accordance with the present invention.

However, DP 12 executes the DBcc instruction in a different manner than the MC68000. Upon receiving a DBcc instruction in the instruction stream, DP 12 proceeds as shown in FIG. 8 to initially calculate a branch destination address by adding the specified displacement to the present value in the program counter PC, but does not load this new address into the PC at this time. DP 12 then tests the selected termination condition, and if such termination condition for the loop is true, fills the instruction pipeline from memory 20, incrementing the "old" PC as appropriate, and then begins execution of the next instruction in the instruction stream. If the termination condition is false, DP 12 uses the branch destination address as a temporary PC, and prefetches the first word from this "new" PC into IRC 50. DP 12 then tests the loop count in the specified data register. If the count is zero (0), DP 12 decrements the loop count, fills the instruction pipeline from the "old" PC, and begins execution of the next instruction in the instruction stream in the same manner as if the termination condition had been found to be true. If the count is not equal to zero (0), DP 12 decrements the loop count, loads the preincremented branch destination address into the PC and prefetches the second word following this "new" PC, thus advancing the instruction from the branch destination address into IR 52. However, before "taking the branch", DP 12, unlike the MC68000, tests the displacement value. If the displacement value is minus 4 (−4), indicating that the branch destination is the instruction immediately preceeding the DBcc instruction in the instruction stream, DP 12 sets the Loop Mode Bit in the Special Status Word Internal 90 (see FIG. 7) associated with Field Translation Unit 72 before taking the branch.

Recall that the instruction pipeline has a maximum length or capacity of three (3) words. Since the DBcc instruction consists of (2) words (an operation word and a branch address word), only one (1) word is available in the pipeline for another instruction. In DP 12, such single word instructions are referred to as being "loopable" instructions, and include all of the instructions. Descriptions of each of such instructions are contained in 16-*BIT MICROPROCESSOR USER'S MANUAL*, Third Edition, 1982, which is readily available upon request from Motorola, Inc.

Assume now that one of these loopable instructions, say the "Compare Memory to Memory" (CMPM), happens to be the instruction immediately preceding the DBcc instruction in the instruction stream. In general, this instruction requires DP 12 to internally subtract a source operand from a destination operand, but without actually changing the value of the destination operand, and then to set the condition codes according to the results of the subtraction. The operands are always addressed with the postincrement addressing mode using the address registers (RXA and RYA) specified in the instruction. The size of the operands may be specified to be byte, word, or long word. For the present example, a word operand length will be assumed.

Figure 9:
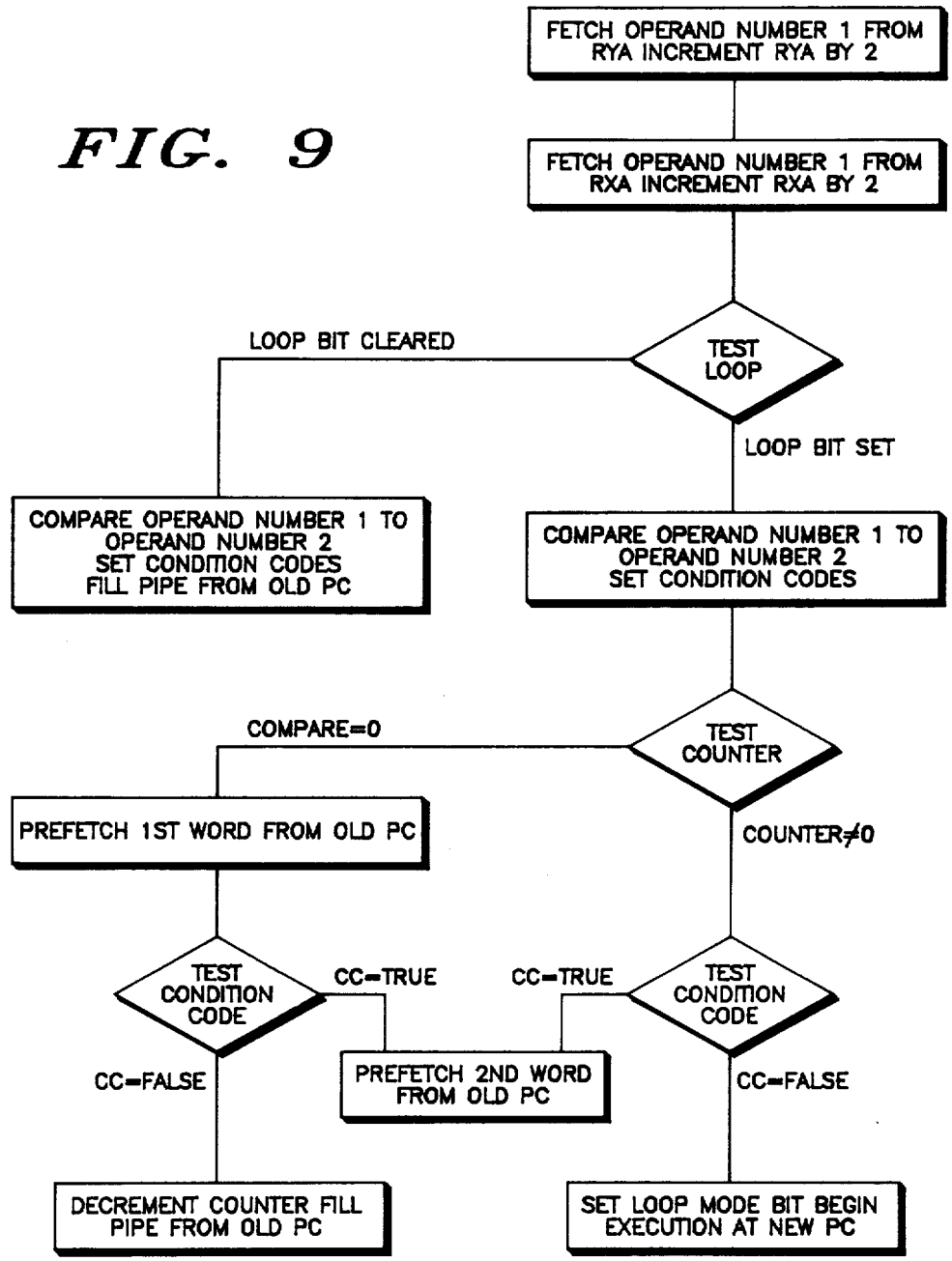
FIG. 9 is a flow diagram of a typical loopable instruction in accordance with the present invention.

Upon initially encountering this CMPM.W instruction, DP 12 will proceeds as shown in FIG. 9 to use the address in the specified address register (RYA) to fetch the source operand from memory 20, and then increment RYA by two (2) since the operand length is two (2) bytes or one (1) word. DP 12 will then use the address in the other specified address register (RXA) to fetch the destination operand from memory 20, and then increment RXA by two (2) also. At this point, DP 12 will proceed differently than the MC68000 by testing the state of the Loop Mode Bit to determine if the loop mode of processing is in effect. Since the Loop Mode Bit is always reset after the execution of each instruction other than the DBcc, the Loop Mode Bit will be determined to be "clear" and DP 12 will simply proceed to "compare", by subtraction, the source and destination operands and then set the appropriate condition codes. DP 12 then fills the instruction pipeline from the "old" PC, incrementing the PC as appropriate.

Since the DBcc instruction is by definition the next instruction in the pipeline, DP 12 will proceed as described above. Assuming that the specified condition is not satisfied and that the loop counter is not exhausted, DP 12 will again prefetch the CMPM.W instruction and the DBcc instruction to fill the pipeline, but will save the branch address displacement within the execution unit 46. Upon determining that all of the preconditions are satisfied, DFP 12 will set the Loop Mode Bit to initiate the loop mode of processing, immediately prior to beginning the second execution of the CMPM.W instruction.

As in the initial execution of the CMPM.W instruction, DP 12 will use the postincremented address in the specified address register (RYA) to fetch the next source operand from memory 20, and then postincrement RYA by two (2). DP 12 will then use the postincremented address in the other specified address register (RXA) to fetch the next destination operand from memory 20, and then postincrement RXA by two (2) also. From this point on, DP 12 proceeds considerably different that the MC68000. In particular, DP 12 will also move the CMPM.W instruction from IRC 50 into the FTU register 86 in the Field Translation Unit 72. DP 12 will then test the state of the Loop Mode Bit to determine if the loop mode of processing is in effect. Since the Loop Mode Bit is now set because of the immediately preceeding execution of the DBcc instruction, DP 12 will still proceed to "compare", by subtraction, the source and destination operands and then set the appropriate condition codes. However, instead of advancing the instructions in the pipeline and loading the next word in the instruction stream into the pipeline, DP 12 will now "circulate" the pipeline by advancing the DBcc instruction from IRC 50 into IR 52 and IRD 64 and then moving the CMPM.W instruction from the FTU register 86 into IRC 50. Rather than forcing the reexecution of the DBcc microsequence described above, the microsequence for the CMPM.W instruction in DP 12 now checks the loop count itself. If the count is exhausted, DP 12 will fill the pipeline using the "old" PC to prefetch the instructions in the instruction stream following the DBcc instruction. If the loop count is not exhausted, DP 12 will test the condition code. If the condition code is satisfied, DP 12 will fill the pipeline using the "old" PC to prefetch the instructions in the instruction stream following the DBcc instruction. If the condition code is not satisfied, DP 12 will decrement the loop count and then set the Loop Mode Bit to continue the loop mode of processing. DP 12 will simply circulate the pipeline and begin execution at the "new" PC, that is the CMPM.W instruction which has now been recirculated internally around the instruction pipeline back into IR 52.

Each time that the pipeline is circulated, one (1) instruction fetch bus cycle is saved. An additional instruction fetch bus cycle is saved each time the loop is repeated, since the branch address displacement word of the DBcc instruction is saved internally in execution unit 46. Thus, for the two (2) stage pipeline embodiment of DP 12 described herein, three (3) instruction fetch bus cycles are saved each time the loop is repeated. If the number of stages in the pipeline of DP 12 is increased, a correspondingly larger number of instruction fetch bus cycles may be saved.

Using the guide shown in Appendix I, the detailed microsequence for the DBcc instruction shown in Appendix II may be understood. Similarly, the detailed microsequence for the CMPM.W instruction may be understood. The microsequences for all of the other loopable instructions listed in Appendix IV will be of similar form to that of the CMPM.W instruction, except for the specific operand processing portions thereof. For a general understanding of the latter, as well as all of the other instructions of DP 12, reference may be made to the Appendices of U.S. Pat. No. 4,325,121, referenced above.

Although the present invention has been described in the context of the preferred embodiment thereof, it is intended by the appended claims to cover all modifications of the invention which fall within the true spirit and scope of the invention.

We claim:

1. A method for selectively repeating the execution of an instruction in a data processor comprising:
an instruction pipeline having at least input and output stages;
bus cycle control means for selectively transferring instructions into the input stage of the pipeline;
pipeline control means for selectively advancing the instructions from the input stage of the pipeline to the output stage thereof; and
instruction execution means for executing the instruction in the output stage of the pipeline;
the method comprising the steps of:
selectively setting a loop control bit;
sequentially enabling the bus cycle control means and the pipeline control means to advance an instruction to the output stage of the pipeline;
enabling the instruction execution means to execute said instruction at the output stage of the pipeline; and
if said loop control bit is set, enabling the pipeline control means to advance the instructions in the pipeline while inserting said instruction into a selected stage of the pipeline.

2. The method of claim 1 including the further step of:
detecting a predetermined instruction at the output stage of said pipeline; and
wherein the step of selectively setting said loop control bit is further defined as selectively setting said loop control bit in response to said predetermined instruction being detected at the output stage of said pipeline.

3. In a data processor comprising:
an instruction pipeline having at least input and output stages;
bus cycle control means for selectively transferring a stream of instructions into the input stage of the pipeline;
pipeline control means for selectively advancing the instructions from the input stage of the pipeline to the output stage thereof; and
instruction execution means for selectively executing each instruction advanced to the output stage of the pipeline, including a conditional branch instruction which specifies a selected branch destination and a selected control condition upon which the branch will be taken;
a method for repeating the execution of a selected loop of the instructions in the stream of instructions with minimal use of the bus cycle control means, comprising the steps of:
(a) detecting the execution by the instruction execution means of one of said conditional branch instructions which specifies a branch destination corresponding to a target instruction preceding the conditional branch instruction in said stream of instructions by no more than the number of stages in the pipeline, the set of instructions between said target instruction and said conditional branch instruction, inclusive, comprising said loop of instructions;

(b) sequentially enabling the bus cycle control means and the pipeline control means to transfer said loop of instructions into the pipeline, and to advance said target instruction to the output stage of the pipeline;

(c) enabling the instruction execution means to execute the instruction at the output stage of the pipeline;

(d) enabling the pipeline control means to advance the instructions in the pipeline while circulating the instruction just executed into a selected stage of the pipeline; and (e) if the instruction at the output stage of the pipeline is not the conditional branch instruction, returning to step (c); but (f) if the instruction at the output stage of the pipeline is the conditional branch instruction and said control condition is not satisfied, enabling the pipeline control means to again advance the instructions in the pipeline while circulating the conditional branch instruction into said selected stage of the pipeline, and then returning to step (c);

whereby the data processor selectively repeats the execution of said loop of instructions by circulating said loop of instructions with said pipeline.

4. In a data processor comprising:

an instruction pipeline having at least input and output stages;

bus cycle control means for selectively transferring instructions into the input stage of the pipeline;

pipeline control means for selectively advancing the instructions from the input stage of the pipeline to the output stage thereof; and instruction execution means for executing the instruction in the output stage of the pipeline;

the improvement comprising:

means for selectively setting a loop control bit;

means for sequentially enabling the bus cycle control means and the pipeline control means to advance an instruction to the output stage of the pipeline;

means for enabling the instruction execution means to execute said instruction at the output stage of the pipeline; and means for detecting if said loop control bit is set and, if so, for enabling the pipeline control means to advance the instructions in the pipeline while inserting said instruction into a selected stage of the pipeline.

5. The data processor of claim 4 further including:

means for detecting a predetermined instruction at the output stage of said pipeline; and wherein the means for selectively setting said loop control bit are further characterized as selectively setting said loop control bit in response to said predetermined instruction being detected at the output stage of said pipeline by said detecting means.

* * * * *